Figure 1:
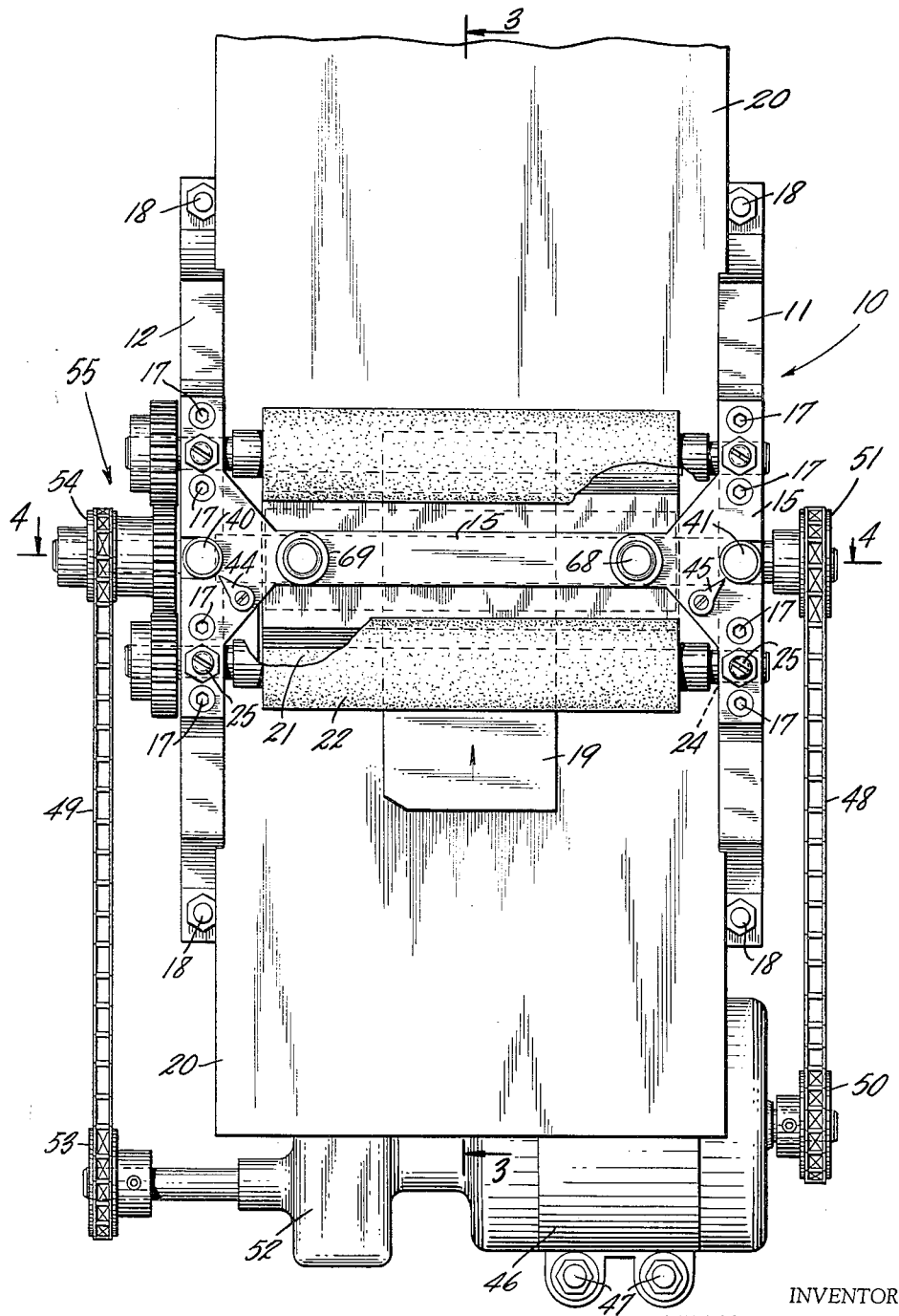

July 11, 1961  W. TRAGERT  2,991,701
PLANING MACHINE
Filed Nov. 18, 1957  4 Sheets-Sheet 1

INVENTOR.
WILLIAM TRAGERT
BY
Brumbaugh, Free, Graves & Donohue
his ATTORNEYS

July 11, 1961 W. TRAGERT 2,991,701
PLANING MACHINE
Filed Nov. 18, 1957 4 Sheets-Sheet 2

INVENTOR.
WILLIAM TRAGERT
BY
Brumbaugh, Free, Graves & Donohue
his ATTORNEYS

July 11, 1961

W. TRAGERT 2,991,701

PLANING MACHINE

Filed Nov. 18, 1957

4 Sheets-Sheet 3

INVENTOR.
WILLIAM TRAGERT
BY
*Brumbaugh, Free, Graves & Donohue*
his ATTORNEYS

July 11, 1961

W. TRAGERT 2,991,701

PLANING MACHINE

Filed Nov. 18, 1957

4 Sheets-Sheet 4

INVENTOR.
WILLIAM TRAGERT

BY
Brumbaugh, Free, Graves & Donohue
his ATTORNEYS

United States Patent Office 2,991,701
Patented July 11, 1961

2,991,701
PLANING MACHINE
William Tragert, Brooklyn, N.Y., assignor to Wassell Organization, Inc., Westport, Conn., a corporation of Delaware
Filed Nov. 18, 1957, Ser. No. 697,231
1 Claim. (Cl. 90—16)

This invention relates to new and useful improvements in planing machines, and, more particularly, to the novel construction and combination of parts for a planing machine.

While planing machines have heretofore been provided for working relatively rigid material, it has been found that such machines do not maintain the control over the material as is required in planing or shaving a material as thin as, for example, a sheet of paper. When such extremely thin sheet material is planed by these prior machines, the material buckles, flutters, and vibrates resulting in a chopped surface rather than the smooth surface which is desired.

Accordingly, it is a principal object of the present invention to provide a planing machine with a structure which is sturdy and dependable but also is capable of maintaining control over extremely thin material to be planed.

It is also an important object of this invention to provide a planing machine with adjustments for the cutting and work controlling elements which can be quickly and accurately adjusted in its operation.

A further object of the present invention is to provide a planing machine which is constructed to hold, to a high degree of accuracy, the work in the proper relation to the cutter.

A still further object of the present invention is to provide a planing machine which will hold the work effectively and continuously during the planing operation.

The invention, generally, provides a planing machine for shaving a relatively thin sheet of material, as for example, plastic business machine cards, or the like, to a predetermined thickness. A first guide member is positioned to support each of a plurality of business machine cards as they are conveyed past a cutting member. A second guide member is provided to urge each card to be planed against the first guide member so that the card is supported firmly during the planing operation. Co-operating rollers are positioned on the input and the output side of the cutting member to feed and extract, respectively, each card to be planed.

The various novel features of construction, combination and relation of parts by which the foregoing and other objects are attained are set forth in detail in the following specification.

The drawings accompanying and forming part of the specification illustrate one practical commercial embodiment of the invention as applied to a planing machine for shaving business machine cards and the like. It should be understood, however, that the invention is not limited to this use or to this particular form of structure as will appear from the scope of the appended claim.

Figure 2:
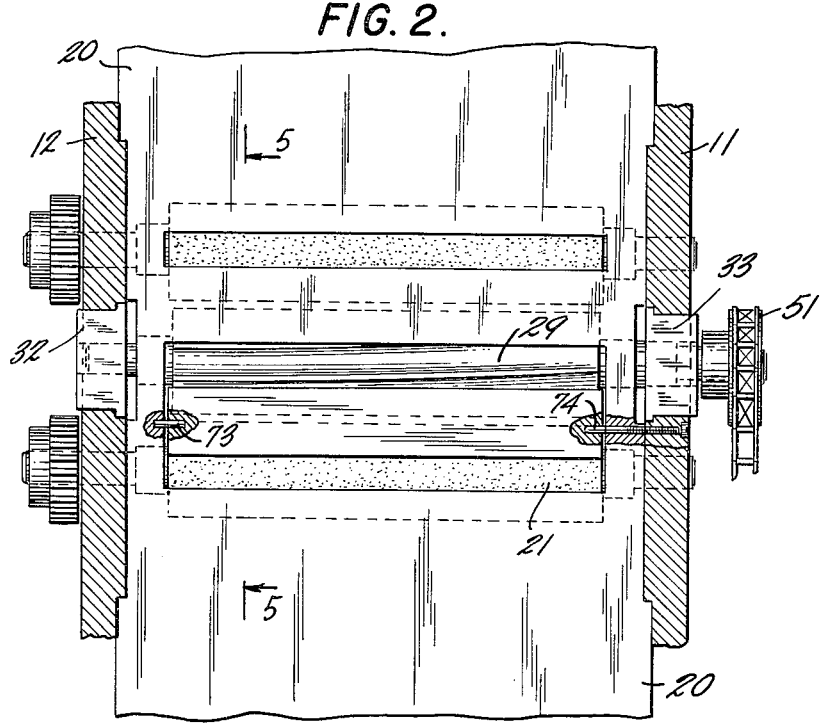
Figure 5:
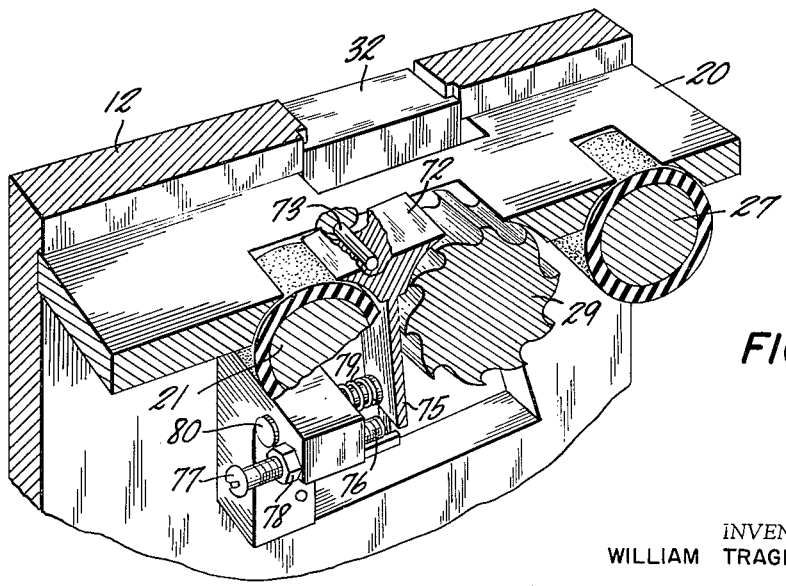
Figure 3:
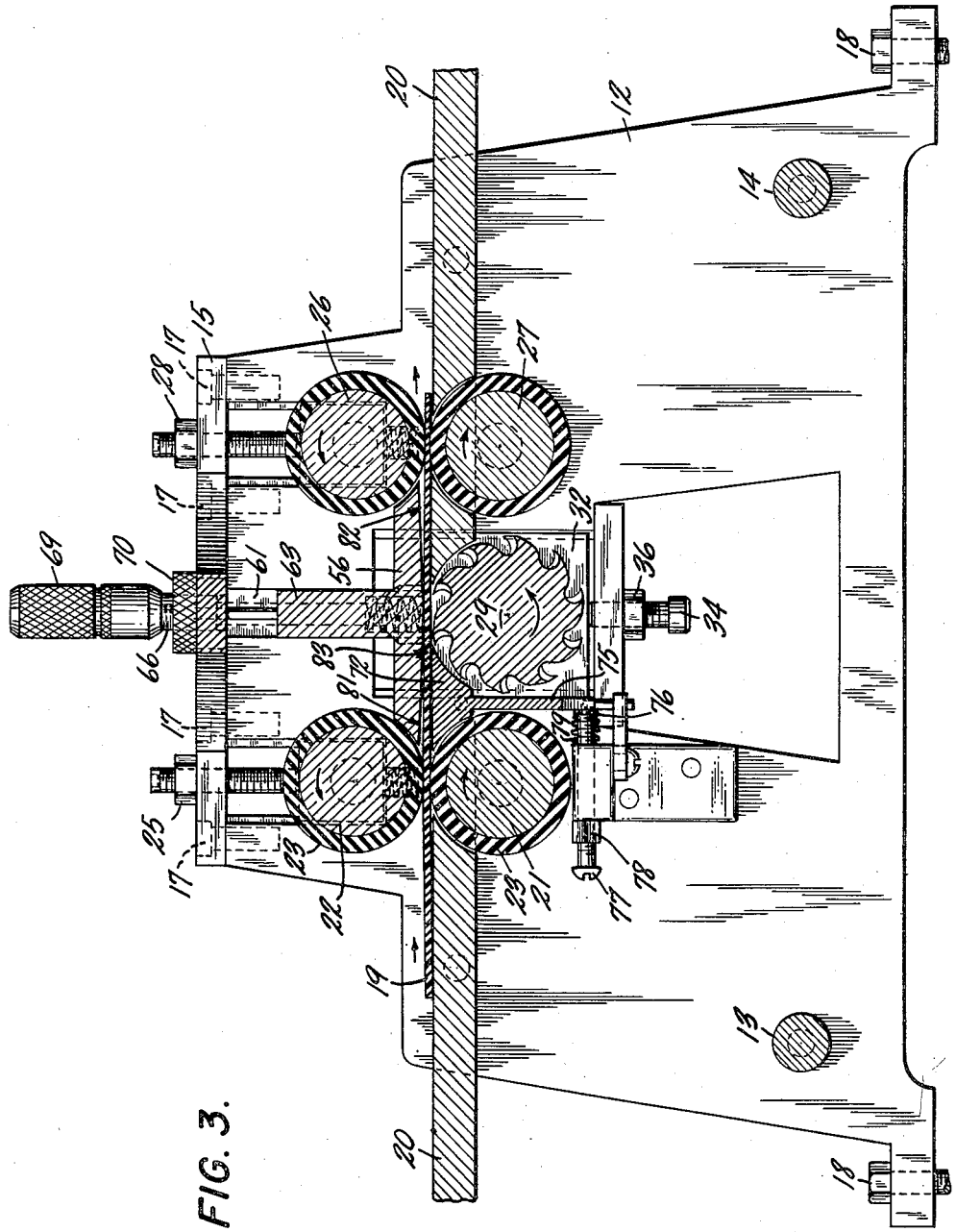
Figure 4:
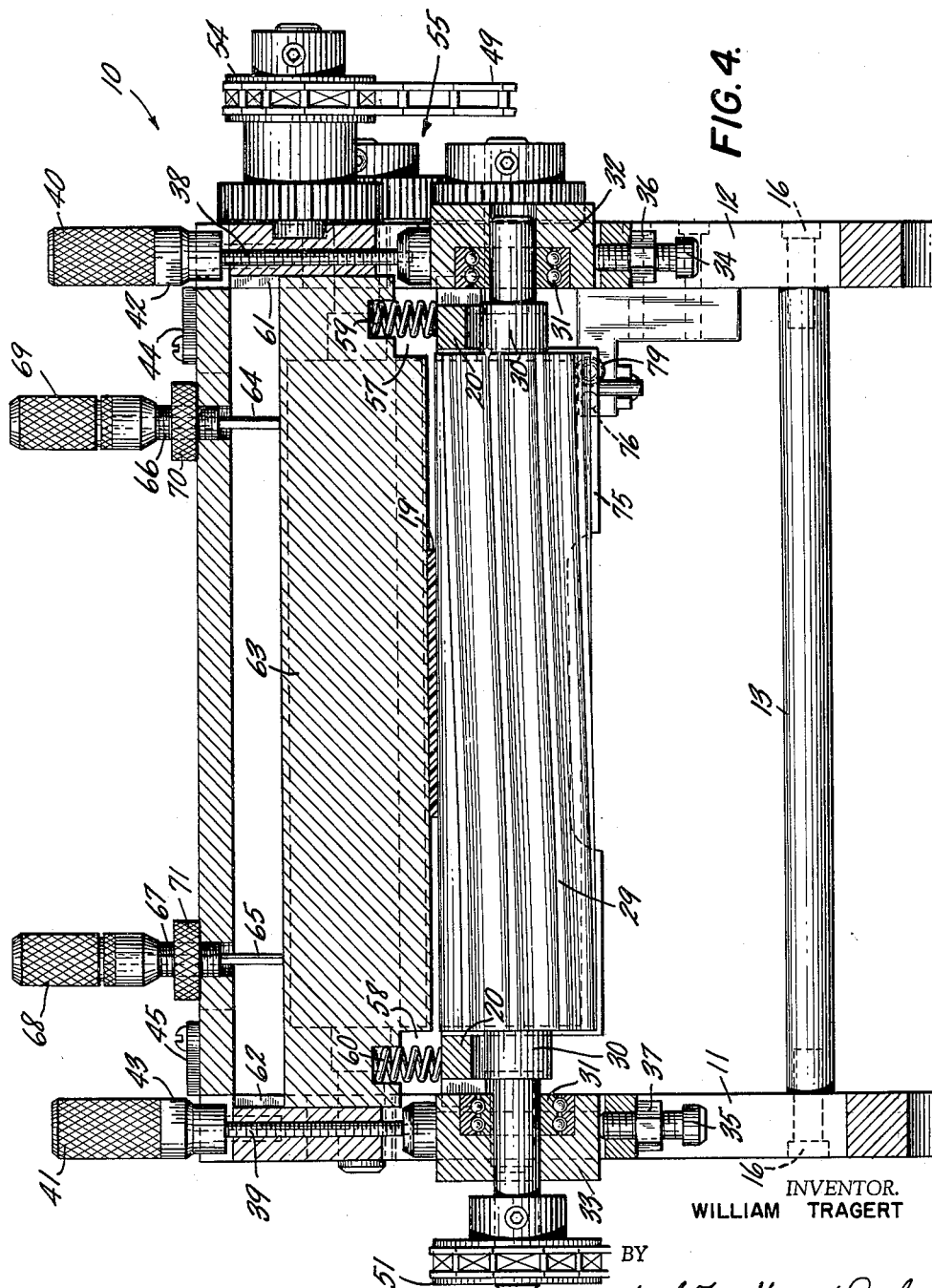

In the drawings:
FIGURE 1 is a plan view of the planing machine embodying the construction of the present invention;
FIGURE 2 is a plan view of the planing machine shown in FIGURE 1 with the upper guide member and the upper rollers removed to show a pivotable lower guide member formed according to the present invention;
FIGURE 3 is a view in elevation along the line 3—3 in FIGURE 1;
FIGURE 4 is a view in elevation taken along the line 4—4 in FIGURE 3; and FIGURE 5 is a sectional view in perspective showing the control of the pivotable lower guide member in accordance with the present invention.

Referring now to the drawings, the planing machine, indicated generally by the numeral 10, may have any suitable frame or base to support the operating parts of the machine. An adequate support is provided in this instance by side members 11 and 12 which are maintained in a fixed, spaced apart relation by rod members 13 and 14 at the bottom and by an I-shaped yoke 15 at the top. Any suitable means may be used to attach the rod members 13 and 14 as, for example, threaded bolts 16, FIGURE 4. Although any suitable means may be used to attach the I-shaped yoke 15 across the upper portion of the side members 11 and 12, it is preferred to use threaded bolts 17, FIGURES 1 and 3, to permit easy removal of the yoke 15 for maintenance purposes. The planing machine 10 is adapted to be securely attached to a foundation by means of threaded bolts 18, if desired.

To support work to be planed, as for example, a plastic business machine card 19, a table 20 is positioned between and attached to the side members 11 and 12. The card 19, the surface of which is to be planed, or shaved, is fed into the machine by means of cooperating rollers 21 and 22. Although these rollers are clearly shown in FIGURE 3 of the drawings, a section of roller 22 is broken away in FIGURE 1 to show the relative position of the roller 21 in plan view. Each of the rollers 21 and 22 is provided with similar resilient outer material 23 for developing greater friction in gripping the card 19.

Each end of the shaft upon which the roller 21 is mounted is journalled in suitable, relatively fixed bearings, indicated by the numeral 24 in FIGURE 1. The roller 22, on the other hand, is journalled in bearings positioned in a movable support to permit adjustment of the space between the rollers 21 and 22 to feed cards of various thicknesses. Adjustment of the roller 22 is accomplished by turning the threaded member 25.

Positioned at the output or discharge end of the machine 10 are rollers 26 and 27 which are identical to the previously described rollers 21 and 22 even to the manner of adjustment by a threaded member 28.

A rotary cutter 29 is mounted on a shaft 30, which shaft, in turn, is journalled in suitable, identical bearings 31 at each end. The bearings 31 are supported in block members 32 and 33 which are adjustable to position accurately the cutter 29 relative to the surface of the card 19 being conveyed through the machine. A lower support for the blocks 32 and 33 is provided by the threaded bolts 34 and 35, respectively. The bolt 34 is threaded upwardly and locked into position by a lock nut 36, and the bolt 35 is locked into position by the lock nut 37. The relative position of the blocks 32 and 33 is determined accurately by threaded rod members 38 and 39, respectively, which are tightened against the blocks by knurled micrometer knobs 40 and 41. Vernier markings 42 and 43 are read by means of pointers 44 and 45 to insure that each end of the cutter shaft 30 is adjusted to the same relative position with respect to the other end. It should be noted that in its preferred form, the cutter 29 is provided with a plurality of cutting teeth which are inclined at an angle or, in other words, are spiralled in order to present a smoother cutting action.

Power is supplied to the various rollers and to the cutter element by means of a suitable motor 46, FIGURE 1. The motor 46 is mounted on a suitable foundation which may be the foundation of the planing machine 10, if desired, by means of threaded bolts 47 in order to maintain the drive chains 48 and 49 taut. One end of the motor 46 turns a sprocket 50 which, by means of the chain 48, supplies power through sprocket 51 to the rotary cutter 29 at a predetermined speed. Since it is generally preferable that the speed of the rollers be less than the speed of the cutter, the opposite end of the motor 46 from the sprocket 50 is attached through a suitable speed reduction device 52 to a sprocket 53. Power from the sprocket 53 is transmitted through the chain 49 to a sprocket 54 which, in turn, drives the various rollers through a suitable gear arrangement indicated generally by the numeral 55. In this manner each of the rollers is maintained at a constant speed to feed each of the cards 19 through the machine. Of course, it is understood that other driving means than chains may be used although it should be recognized that in some instances belt drives may inherently involve slippage which could possibly result in damage to the material being planed. Also, it is conceivable that the motor 46 may be connected directly to the sprocket 53 and through a speed step-up drive to the sprocket 50, if desired.

An upper, or first, guide member 56, which resembles an inverted T, is constructed to permit accurate adjustment relative to the cutter 29. This guide member 56 is resiliently supported by coil springs 57 and 58 which are fitted between recesses 59 and 60, respectively, and the table 20. To guide the movement of the guide member 56, its ends are slidable vertically within slots 61 and 62. A vertically extending body portion 63 of the inverted T-shaped guide member 56 bears against two downwardly depending stop pins 64 and 65 which are extensions of two threaded members 66 and 67, respectively. The position of the pins 64 and 65 is controlled independently of each other by knurled knobs 68 and 69 to accurately adjust the space through which the card 19 is to pass. When these adjustments have been determined, the stop pins 64 and 65 are locked into position by the lock nuts 70 and 71, respectively. To facilitate the feeding and extraction of each card 19, the guide member 56 is inclined slightly away from the cutter 29, as indicated at 81 and 82.

In accordance with the present invention, the planing machine is provided with a means for supporting the card to be planed as close to the cutter 29 as possible. To describe this support, particular reference is made to FIGURES 2, 3 and 5 of the drawings. A pivotable lower, or second, guide member 72 is positioned between the lower feed roller 21 and the rotary cutter 29 and is supported by a fixed pin 73 at one end and by a removable pin 74 at the opposite end. To control the degree of pivot which this lower guide member 72 may assume, a downwardly depending portion 75 acts against a coil spring 79, the tension of which is adjustable by means of a threaded bolt 80. A limit to the clockwise movement of the depending portion 75 is provided by the stop 76 which is adjustable by the threaded bolt 77 and is locked in a desired position by a lock nut 78. The pivotable guide member 72 is shown in FIGURE 5 in a tilted position as it is urged in a counterclockwise direction by the coil spring 79. As a card to be planed passes over the surface of the guide member 72 and under the surface of the upper guide member 56, the extension 75 is pivoted slightly in a clockwise direction against the coil spring 79 such that the card is supported at a point 83 immediately adjacent the rotary cutter 29. Such a support eliminates any buckling or fluttering of a relatively thin material as it is being planed and permits the surface of, for example, a plastic business machine card, to be shaved with a high degree of accuracy.

The invention has been shown by way of example only and many modifications and variations may be made therein without departing from the spirit of the invention. Therefore, it is understood that the invention is not to be limited to any specified form or embodiment except insofar as such limitations are set forth in the claim.

I claim:

A planing machine for planing a business machine card or the like to a predetermined thickness comprising a base having spaced-apart side members, each of said side members having a slot extending vertically therein and adapted to receive a movable member, a rotary cutter supported between said movable members, first micrometer adjusting means to position said rotary cutter in an accurately predetermined position, an upper guide member having incorporated therein a guide plate tapered from said cutter to permit the receipt and discharge of a card, first spring means interposed between said base and said guide member to support said upper guide member on said base to bias said guide member and guide plate away from said rotary cutter, second micrometer adjusting means to limit the upward movement of said upper guide first spring means, two feed rollers spaced apart vertically on one side of said cutter to feed a card to be planed, two other rollers on the discharge side of said cutter to discharge a card after planing, said two feed rollers being positioned relatively close to said rotary cutter to form a space therebetween, a pivotable lower guide plate positioned intermediate the lower one of said feed rollers and said rotary cutter, a relatively thin portion of said lower guide plate depending within said space between said lower feed roller and said rotary cutter terminating at a lower end below said lower feed roller, second spring means to bear against said lower end of said depending portion to urge away from said rotary cutter that portion of said lower guide plate which is next to said rotary cutter, and an adjustable stop adjacent said depending portion of said lower guide plate so that the portion of said lower guide plate which is next to said rotary cutter is stopped in its rotation at a predetermined distance from said rotary cutter.

References Cited in the file of this patent

UNITED STATES PATENTS

| | | |
|---|---|---|
| 404,433 | Plummer | June 4, 1889 |
| 1,264,934 | Howard | May 7, 1918 |
| 1,292,579 | Clement et al. | Jan. 28, 1919 |
| 1,333,710 | Folsom | Mar. 16, 1920 |
| 1,634,789 | Melby | July 5, 1927 |
| 1,724,741 | Woodward | Aug. 13, 1929 |
| 2,334,787 | Olander | Nov. 23, 1943 |
| 2,658,424 | Huck | Nov. 10, 1953 |
| 2,765,711 | Armitage et al. | Oct. 9, 1956 |

FOREIGN PATENTS

| | | |
|---|---|---|
| 19,175 | Great Britain | 1913 |